United States Patent
Keltgen et al.

(10) Patent No.: US 12,031,852 B2
(45) Date of Patent: Jul. 9, 2024

(54) MAGNETIC FLOWMETER WITH FLOW TUBE LINER HAVING ADHESION FEATURE IN AN EXTERIOR SURFACE

(71) Applicant: Micro Motion, Inc., Boulder, CO (US)

(72) Inventors: Paul Michael Keltgen, Waconia, MN (US); Michael John Mayer, Waconia, MN (US); Michael Jeffrey Mikolichek, Farmington, MN (US); Eddy Sun, Jiangsu Province (CN); Yabin Zhang, Jiangsu (CN)

(73) Assignee: MICRO MOTION, INC., Boulder, CO (US)

( * ) Notice: Subject to any disclaimer, the term of this patent is extended or adjusted under 35 U.S.C. 154(b) by 350 days.

(21) Appl. No.: 17/442,354

(22) PCT Filed: Aug. 19, 2021

(86) PCT No.: PCT/CN2021/113522
§ 371 (c)(1),
(2) Date: Sep. 23, 2021

(87) PCT Pub. No.: WO2023/019511
PCT Pub. Date: Feb. 23, 2023

(65) Prior Publication Data
US 2023/0059062 A1    Feb. 23, 2023

(51) Int. Cl.
*G01F 1/58* (2006.01)
*G01F 1/60* (2006.01)
*G01F 15/00* (2006.01)

(52) U.S. Cl.
CPC ............ *G01F 1/588* (2013.01); *G01F 15/006* (2013.01); *G01F 1/60* (2013.01)

(58) Field of Classification Search
CPC ........... G01F 1/588; G01F 15/006; G01F 1/60
See application file for complete search history.

(56) References Cited

U.S. PATENT DOCUMENTS

| | | |
|---|---|---|
| 3,347,568 A | 10/1967 | Weeden, Jr. et al. |
| 3,695,104 A | 10/1972 | Mannherz et al. |

(Continued)

FOREIGN PATENT DOCUMENTS

| | | | |
|---|---|---|---|
| CN | 200982351 Y | | 11/2007 |
| CN | 201787978 U | * | 4/2011 |

(Continued)

OTHER PUBLICATIONS

International Search Report and Written Opinion of the International Searching Authority from International Application No. PCT/US2021/022580, dated Jun. 28, 2021.

(Continued)

*Primary Examiner* — Peter J Macchiarolo
*Assistant Examiner* — John M Royston
(74) *Attorney, Agent, or Firm* — Westman, Champlin & Koehler, P.A.

(57) ABSTRACT

A magnetic flowmeter for sensing process fluid flow includes a flow tube configured to receive the process fluid flow there through and a plurality of electrodes disposed to contact process fluid. At least one electromagnetic coil is disposed proximate the tube. A flow tube liner is provided in the flow tube having an interior surface configured to contact process fluid and an exterior surface mounted to the flow tube. The flow tube liner has at least one adhesion feature in the exterior surface which promotes adhesion between the flow tube liner and the flow tube. A method is also provided.

20 Claims, 4 Drawing Sheets

(56) References Cited

U.S. PATENT DOCUMENTS

| | | | |
|---|---|---|---|
| 3,750,468 | A | 8/1973 | Grauer |
| 4,206,640 | A | 6/1980 | Suzuki |
| 5,773,723 | A | 6/1998 | Lewis et al. |
| 6,330,831 | B1 | 12/2001 | Lynnworth et al. |
| 6,539,981 | B1 | 4/2003 | Kleven et al. |
| 7,637,169 | B2 | 12/2009 | Shanahan et al. |
| 7,823,461 | B2 | 11/2010 | Kappertz et al. |
| 9,027,418 | B2 | 5/2015 | Smith et al. |
| 9,127,974 | B2 | 9/2015 | Rogers et al. |
| 9,316,514 | B2 | 4/2016 | Smith et al. |
| 9,464,926 | B2 | 10/2016 | Smith et al. |
| 9,464,927 | B2 | 10/2016 | Foster |
| 9,488,511 | B2 | 11/2016 | Barto |
| 10,488,235 | B2 | 11/2019 | Wohlgemuth et al. |
| 10,620,024 | B2 | 4/2020 | Voigt |
| 2005/0022594 | A1* | 2/2005 | Padmanabhan .... G01N 33/0014 73/204.26 |
| 2005/0210997 | A1 | 9/2005 | Lincoln et al. |
| 2008/0053241 | A1 | 3/2008 | Kappertz et al. |
| 2008/0196510 | A1 | 8/2008 | Nielsen |
| 2010/0317789 | A1 | 12/2010 | Greene et al. |
| 2013/0305838 | A1 | 11/2013 | Mikolichek et al. |
| 2013/0319133 | A1 | 12/2013 | Lubbers |
| 2014/0000382 | A1 | 1/2014 | Iijima |
| 2014/0053908 | A1 | 2/2014 | Smillie |
| 2014/0083199 | A1 | 3/2014 | Rogers |
| 2014/0090483 | A1 | 4/2014 | Smith et al. |
| 2016/0091353 | A1 | 3/2016 | Foster |
| 2016/0305803 | A1 | 10/2016 | Wohlgemuth et al. |
| 2016/0313154 | A1* | 10/2016 | Wohlgemuth ........ G01F 15/006 |
| 2016/0348812 | A1 | 12/2016 | Hairston et al. |
| 2018/0156649 | A1 | 6/2018 | Voigt |

FOREIGN PATENT DOCUMENTS

| | | | |
|---|---|---|---|
| CN | 204679131 | U * | 9/2015 |
| CN | 105829838 | A | 8/2016 |
| CN | 107636422 | A | 1/2018 |
| CN | 207423294 | U | 5/2018 |
| CN | 207703269 | U | 8/2018 |
| DE | 102014114289 | A1 | 4/2016 |
| EP | 0581017 | A1 | 2/1994 |
| EP | 0852703 | A1 | 7/1998 |
| WO | 9309403 | A1 | 5/1993 |
| WO | WO 97/12209 | A1 | 4/1997 |
| WO | 2005057140 | A1 | 6/2005 |
| WO | WO 2010/094293 | A1 | 8/2010 |
| WO | 2016053716 | A1 | 4/2016 |

OTHER PUBLICATIONS

International Search Report and Written Opinion of the International Searching Authority from International Application No. PCT/US2021/027497, dated Jul. 12, 2021.

Scheirs J., "Fluoropolymers—Technology, Markets and Trends", A Rapra Industry Analysis Report, Rapra Review Reports, United Kingdom, Apr. 1, 2001 (Apr. 1, 2001), pp. 1-50, XP003032133.

Office Action from Chinese Patent Application No. 202022112780.2, dated Dec. 7, 2020.

Notification of Transmittal of the International Search Report and the Written Opinion of the International Searching Authority, or the Declaration from International Application No. PCT/CN2021/113522, dated Mar. 1, 2022.

Office Action from U.S. Appl. No. 16/906,219, dated Oct. 4, 2021.
Office Action from U.S. Appl. No. 17/024,079, dated Feb. 15, 2022.
Office Action from U.S. Appl. No. 17/024,079, dated Oct. 18, 2021.
Communication from European Patent Application No. 21718279.9, dated Dec. 13, 2022.
Office Action from Indian Patent Application No. 202327001187, dated Apr. 6, 2023.
Communication from European Patent Application No. 21724833.5, dated Apr. 25, 2023.

* cited by examiner

MAGNETIC FLOWMETER WITH FLOW TUBE LINER HAVING ADHESION FEATURE IN AN EXTERIOR SURFACE

CROSS-REFERENCE TO RELATED APPLICATION

This Application is a Section 371 National Stage Application of International Application No. PCT/CN2021/113522, filed Aug. 19, 2021, not yet published, the contents of which are hereby incorporated by reference in their entirety.

BACKGROUND

Magnetic flowmeters (or mag meters) measure flow by Faraday induction, an electromagnetic effect. The magnetic flowmeter energizes one or more coils which generate a magnetic field across a section of a flow tube assembly. The magnetic field induces an electromotive force (EMF) across the flow of conductive process fluid through the flow tube assembly. The resulting potential developed across the conductive fluid is measured using a pair of electrodes that extend into the flowing process fluid. Alternatively, some magnetic flowmeters employ capacitive coupling between the electrodes and the process fluid such that the EMF can be measured without direct contact. The flow velocity is generally proportional to the induced EMF, and the volumetric flow is proportional to the flow velocity and the cross-sectional area of the flow tube.

Magnetic flowmeters are useful in a variety of fluid flow measurement environments. In particular, the flow of water-based fluids, ionic solutions and other conducting fluids can all be measured using magnetic flowmeters. Thus, magnetic flowmeters can be found in water treatment facilities, beverage and hygienic food production, chemical processing, high purity pharmaceutical manufacturing, as well as hazardous and corrosive fluid processing facilities. Magnetic flow meters are often employed in the hydrocarbon fuel industry, which sometimes employs hydraulic fracturing techniques utilizing abrasive and corrosive slurries.

Magnetic flowmeters can be specified with a variety of different lining and/or electrode materials to suit the application for which the magnetic flowmeter is employed. Examples of lining materials include polytetrafluoroethylene (PTFE); ethylene tetrafluoroethylene (ETFE); perfluoroalkoxy alkanes (PFA); polyurethane; neoprene; and linatex rubber, as well as other materials. Electrodes may be constructed from any suitable material including 316 L stainless steel; nickel alloy 276; tantalum; platinum/iridium blends; titanium; as well as other suitable materials.

Lining materials are often selected for superior resistance to chemical attack and/or high temperature operation. In at least some applications, fluoropolymer-based liners are being subjected to increased application demands. For example, in the oil and gas industry, some fluoropolymer liners are being subjected to higher pressures and/or temperatures. Such conditions create a challenge in designing and manufacturing robust magnetic flowmeter devices with fluoropolymer liners. This is because at least some fluoropolymers, such as PTFE, experience "creep" also known as flow where the lining material moves slowly or permanently deforms under the influence of persistent mechanical and thermal stresses. Such phenomenon can upset the electrode seal causing a process fluid leak. Adhesives can be used to provide a more secure bond. However, it can be difficult to obtain a good bond between the liner to the flow tube using an adhesive.

SUMMARY

A magnetic flowmeter for sensing process fluid flow includes a flow tube configured to receive the process fluid flow there through and a plurality of electrodes disposed to contact process fluid. At least one electromagnetic coil is disposed proximate the tube. A flow tube liner is provided in the flow tube having an interior surface configured to contact process fluid and an exterior surface mounted to the flow tube. The flow tube liner has at least one adhesion feature in the exterior surface which promotes adhesion between the flow tube liner and the flow tube. A method is also provided.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the Background.

DETAILED DESCRIPTION OF ILLUSTRATIVE EMBODIMENTS

Figure 1:
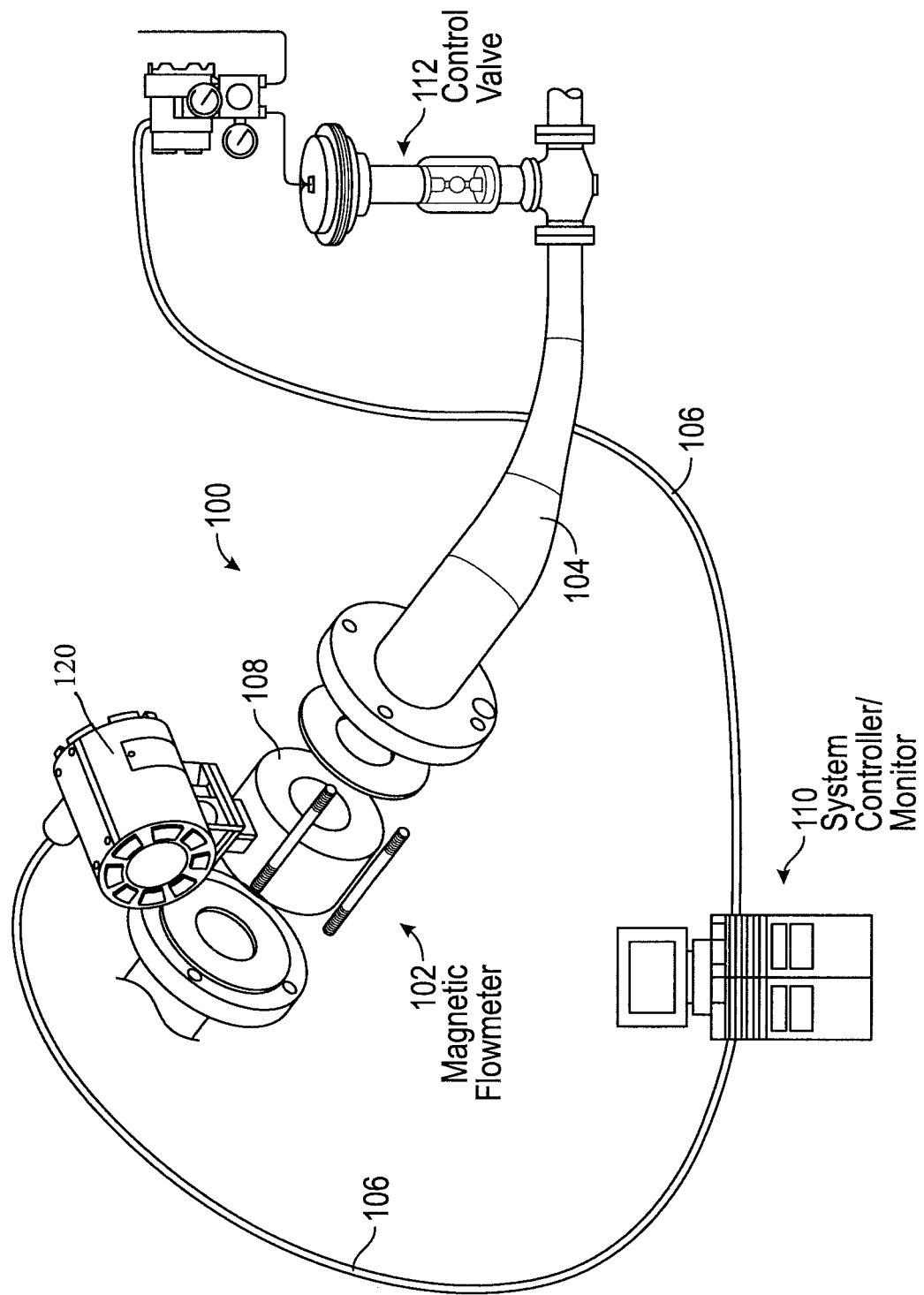
FIG. 1 is a diagram showing a process control system including a magnetic flowmeter.

Embodiments of the present disclosure are described more fully hereinafter with reference to the accompanying drawings. Elements that are identified using the same or similar reference characters refer to the same or similar elements. Some elements may not be shown in each of the figures in order to simplify the illustrations.

The various embodiments of the present disclosure may be embodied in many different forms and should not be construed as limited to the specific embodiments set forth herein. Rather, these embodiments are provided so that this disclosure will be thorough and complete, and will fully convey the scope of the present disclosure to those skilled in the art.

PTFE (polytetrafluoroethylene) is a polymer that is used to line steel pipe to provide process compatibility and electrical insulation in a mag-meter. To hold the PTFE liner in place, an interference fit can be used in which the PTFE is larger in diameter than the host pipe. Often this interference is not adequate to keep the PTFE from shifting within the host pipe.

A method to prevent this shifting is to adhesive bond the PTFE into the host pipe. However, PTFE is not able to be bonded without first being chemically etched to enable bonding. This chemical etching changes the chemical structure of PTFE. However, when etched PTFE is inserted into the host pipe the interference fit scrapes away the chemically etched surface which prohibits adhesive bonding. The interference fit also removes any applied adhesive thereby preventing the adhesive from entering the host pipe. As discussed in the Background section, poor adhesion as well as cold flow and expansion/contraction can lead to leaking of the process fluid. In addition to PTFE, this problem occurs with liners made of materials other than PTFE including other fluoropolymers.

The invention provides an adhesion feature such as one or more grooves cut into an outside diameter of the liner at a depth optimized for adhesive bonding. The adhesion feature both establishes an adhesive bond-line thickness and protects the etching from being scraped away during insertion.

FIG. 1 illustrates a typical environment 100 for magnetic flowmeter 102. Magnetic flowmeter 102 is shown coupled to process piping 104 that also couples to control valve 112. Magnetic flowmeter 102 is an example of one type of process variable transmitter which can be configured to monitor one or more process variables associated with fluids in a process plant such as slurries and liquids in chemicals, pulp, petroleum, gas, pharmaceutical, food and other fluid processing plants.

In magnetic flowmeter 102, the monitored process variable relates to the velocity of process fluid through process piping and thus flow tube 108. Magnetic flowmeter 102 includes electronics housing 120 connected to flow tube 108. Magnetic flowmeter 102 outputs are configured for transmission over long distances to a controller or indicator via communication bus 106. In typical processing plants, communication bus 106 can be a 4-20 mA current loop, a FOUNDATION™. Fieldbus connection, a pulse output/frequency output, a Highway Addressable Remote Transducer (HART®) protocol communication, a wireless communication connection, such as that in accordance with IEC 62591, Ethernet, or a fiber optic connection to a controller such as system controller/monitor 110 or other suitable device. WirelessHART® (IEC 62591) or ISA 100.11a (IEC 62734), or another wireless communication protocol, such as WiFi, LoRa, Sigfox, BLE, or any other suitable protocol. System controller 110 is programmed, for example, as a process monitor, to display flow information for a human operator or as a process controller to control the process using control valve 112 over communication bus 106.

Figure 2:
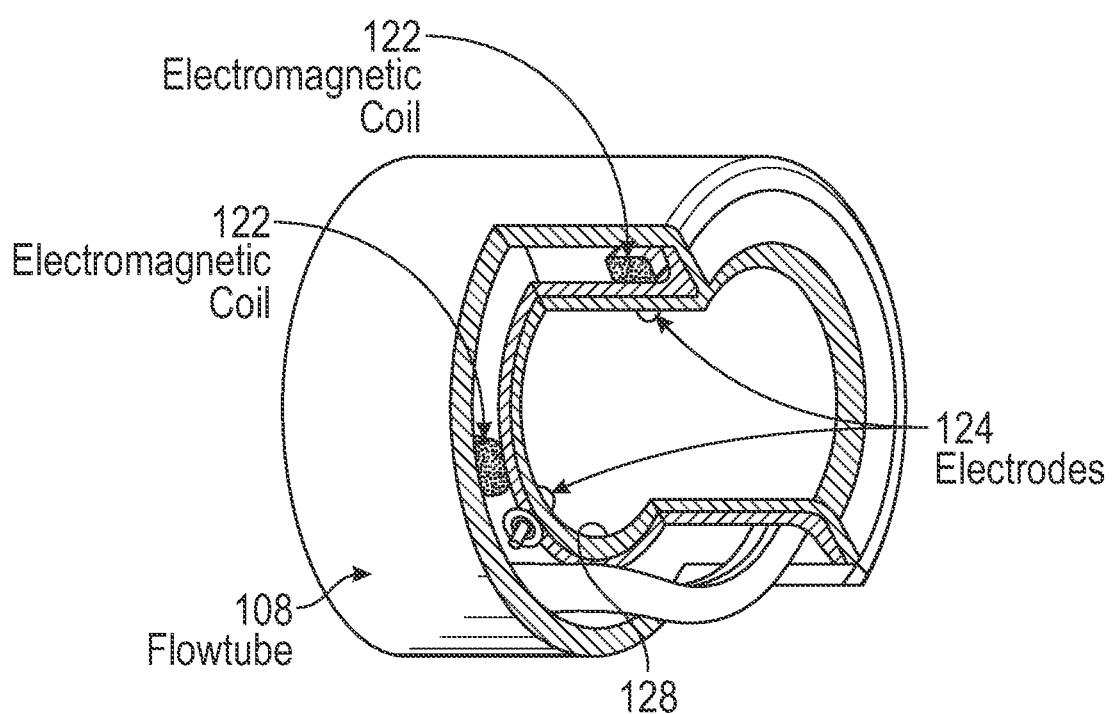
FIG. 2 is a partial cutaway view of the magnetic flowmeter of FIG. 1.

FIG. 2 is a perspective cutaway view of a flow tube 108 of magnetic flowmeter 102. Flow tube 108 includes electromagnetic coils 122 which are used to induce a magnetic field in fluid flowing through flow tube 108. Electrodes 124 in flow tube 108 are used to sense the EMF generated in the fluid due to the velocity of the flow and the applied magnetic field. FIG. 2 also shows a flow tube liner 128 discussed below in more detail. The electrodes 124 are carried in the flow tube liner 128 and positioned to be in electrical contact with the process fluid.

Figure 3:
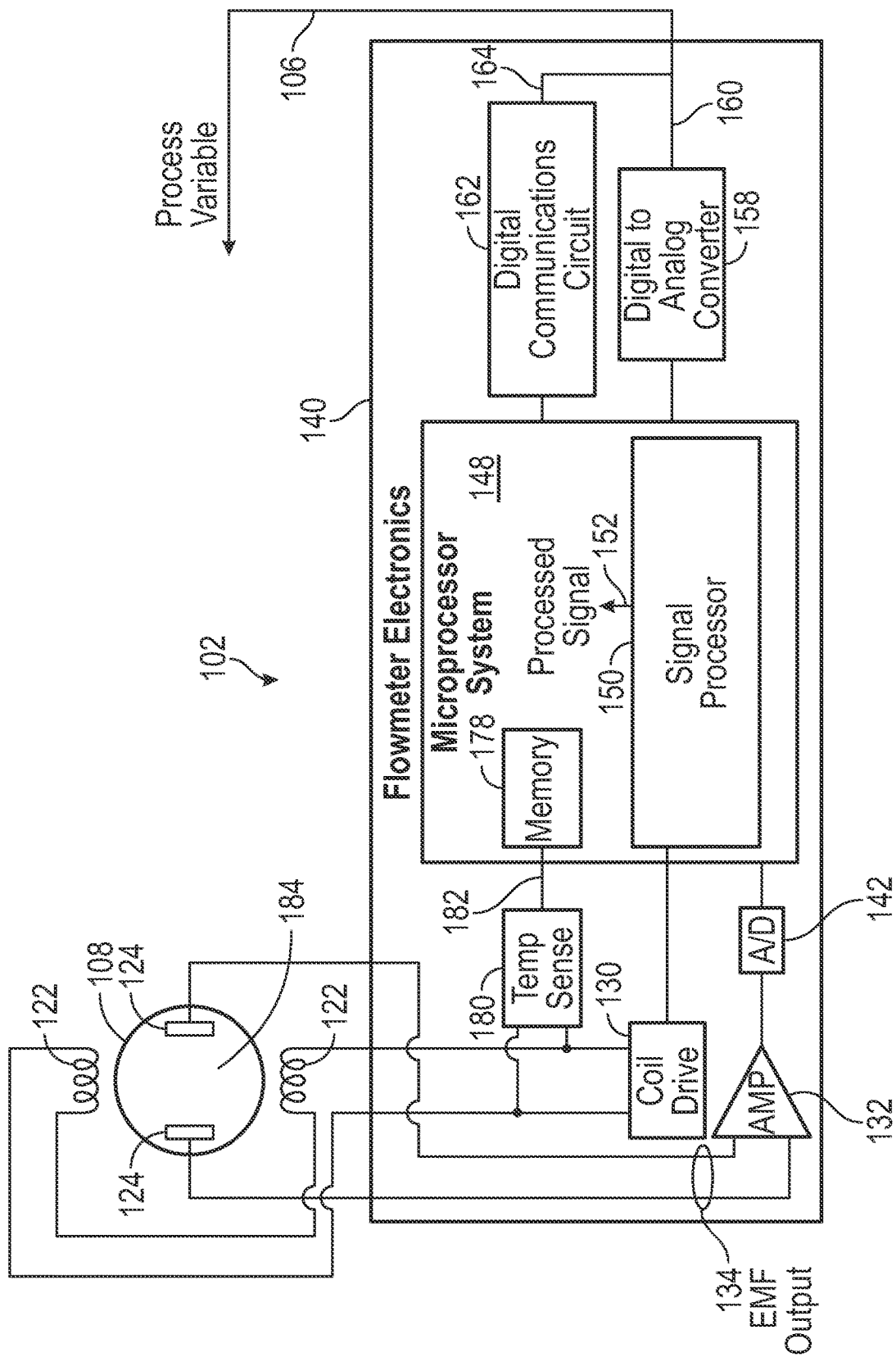
FIG. 3 is a simplified block diagram showing electrical components of a magnetic flowmeter.

FIG. 3 is a system block diagram of an embodiment showing various electrical components of a magnetic flowmeter for measuring a flow of a conductive process fluid through flow tube assembly 108. Coils 122 are configured to apply an external magnetic field in the fluid flow in response to an applied drive current from coil driver 130. Coil driver circuitry 130 provides the drive current to electromagnetic coils 122. EMF sensors (electrodes) 124 electrically couple to the fluid flow and provide an EMF signal output 134 to amplifier 132 related to an EMF generated in the fluid flow due to the applied magnetic field, and fluid velocity. Analog to digital converter 142 provides a digitized EMF signal to microprocessor system 148. A signal processor 150 is implemented in microprocessor system 148 of flow meter electronics 140 which couples to the EMF output 134 to provide an output 152 related to fluid velocity. Memory 178 can be used to store program instructions or other information.

Microprocessor system 148 can be configured to calculate velocity through flow tube 108 in accordance with a relationship between the EMF output 134 and the flow velocity as set forth in Faraday's law, which states:

$$V = \frac{E}{kBD} \qquad \text{Eq. 1}$$

Where E is the EMF output 134, V is the velocity of the fluid, D is the diameter of flow tube 108 and B is the strength of the magnetic field in the fluid. k is a constant of proportionality. A digital to analog converter 158 can be included and coupled to microprocessor system 148 to generate an analog transmitter output 160, if desired, for coupling to communication bus 106. A digital communication circuit 162 generates a digital transmitter output 164. The analog output 160 and the digital output 164 can be coupled to process controllers or monitors as desired.

As discussed above, there are issues attaching the flow tube liner 128 to the interior surface of the flow tube 108. In one configuration, a feature is provided on the exterior surface of the liner to allow adhesive to enter the flow tube 108 as the liner 128 is inserted. One example adhesion feature is one or more grooves cut into the exterior surface of liner 128. This configuration helps eliminate shifting of the liner 128 during manufacture or installation by the customer. It also helps minimize any open space between the liner 128 and the flow tube 108. By minimizing any space between the surfaces, fluid is prevented from entering this space which could result in the fluid migrating to the electrodes 124 of the flow tube 108 thereby causing an electrical short. Further, by reducing any space between these components, the liner 128 has a higher resistance to vacuum as well as any gases which may permeate through the liner to any cavity between the liner 128 and the flow tube 108. Additionally, the configuration helps reduce scrap during manufacture of the liner because of complications of high interference during insertion and failures caused by liner shifting during subsequent manufacturing steps.

Figure 4:
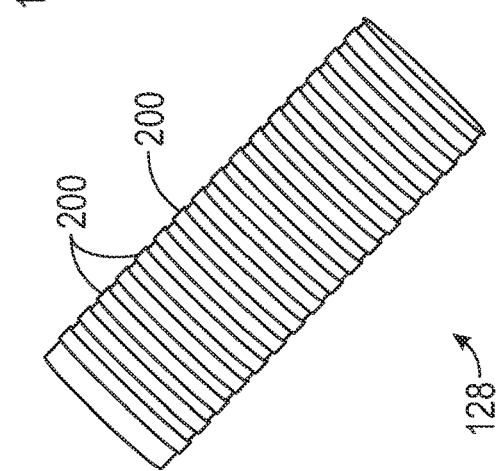
FIG. 4 is a perspective view of a flow tube liner including grooves which extend in a circumferential direction.

FIG. 4 is a side perspective view of flow tube liner 128 including adhesion feature 200. In the configuration of FIG. 4, the adhesion feature 200 comprises one or more grooves which extend around the exterior circumference of liner 128. The adhesion feature 200 can be arranged as a plurality of grooves or can be configured as one or more grooves which are cut in a spiral around the liner 128.

Figure 5:
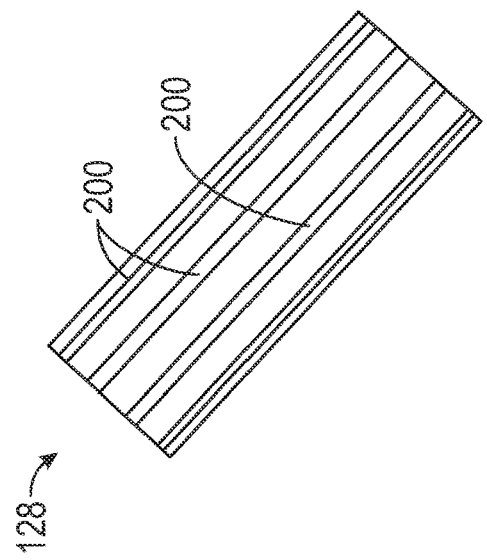
FIG. 5 is a perspective view of a flow tube liner including grooves which extend in an axial direction.

FIG. 5 is a side perspective view of another example configuration of flow tube liner 128 in which adhesion feature 200 is provided which extends along an axial direction of the liner 128. In the configuration of FIG. 5, the adhesion features 200 are shown as a plurality of elongate grooves which extend substantially in an axial direction along an exterior surface of the liner 128.

Figure 6:
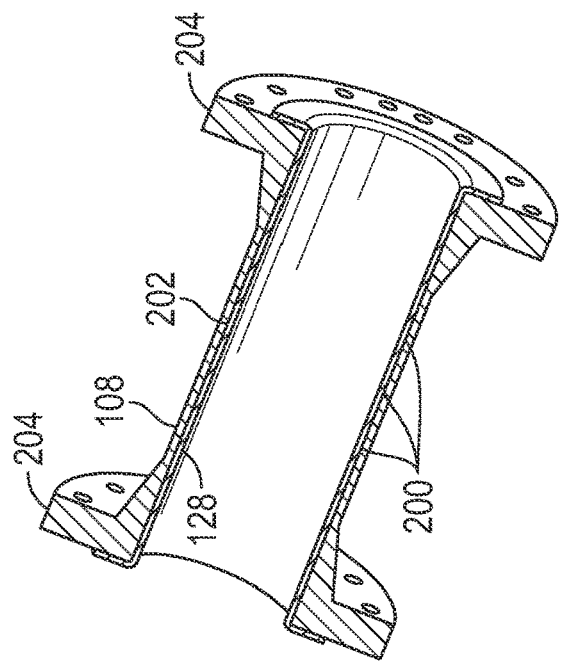
FIG. 6 is a cross-sectional perspective view of a flow tube liner mounted in a flow tube.

FIG. 6 illustrates the liner 128 inserted into and mounted to flow tube 108 using an adhesive 202. The adhesive 202 is positioned between an exterior wall of the liner 128 and an interior wall of the flow tube 108 thereby securing the liner 128 to the flow tube 108. In the configuration of FIG. 6, the adhesion feature 200 comprises one or more grooves which extend around the exterior surface of the liner 128. FIG. 6 also illustrates optional flanges 204 which are used for coupling flow tube 108 to process piping.

In another example configuration, the bore could be machined to alternate diameters in the field. This provides a method for predicting or eliminating the calibration shift. The design can be provided as a solution to electrode coating in the field by allowing the liner/electrode to the reamed in the field. Adhesive reinforces the liner preventing shifting or displacement of the liner which might damage electrode sealing.

Although the present invention has been described with reference to preferred embodiments, workers skilled in the art will recognize that changes may be made in form and detail without departing from the spirit and scope of the invention. With the present invention, the adhesion feature is provided on a flow tube liner to promote adhesion between an exterior surface of the flow tube liner and an interior surface of the flow tube. The adhesion feature may be any type of adhesion feature which operates either alone or in conjunction with an adhesive. Examples of such a adhesion feature include one or more grooves arranged axially, circumferentially, or both axially and circumferentially. The grooves may be short or elongate and need not necessarily extend completely around the exterior circumference of the flow tube liner. Combinations of circumferential and axial grooves or adhesion features may also be employed. Other example adhesion features which may be used include helical grooves, single or multiple spots/pockets and dimples. The at least one adhesion feature may be fabricated using any appropriate technique including machining or molding. In typical configurations, the flow tube is formed of a metal such as stainless steel, a nickel alloy, tantalum, platinum/iridium blends, titanium, etc. The flow tube liner may be fabricated of any fluoropolymer. Examples include polytetrafluoroethylene (PTFE), ethylene tetrafluoroethylene (ETFE), perfluoroalkoxy alkanes (PFA), polyurethane; neoprene, and linatex rubber, as well as other materials. The adhesion feature can be located on the flow tube liner, the flow tube pipe, or both. Multiple types of adhesion features may also be employed.

What is claimed is:

1. A magnetic flowmeter for sensing process fluid flow, the flowmeter comprising:
   a flow tube configured to receive the process fluid flow there through;
   a plurality of electrodes disposed to contact process fluid;
   at least one electromagnetic coil disposed proximate the tube;
   a flow tube liner comprising polytetrafluoroethylene (PTFE) having an interior surface configured to contact process fluid and a chemically etched exterior surface mounted to the flow tube; and
   at least one adhesion feature carried on the exterior surface of the flow tube liner and the flow tube which promotes adhesion between the flow tube liner and the flow tube, wherein the adhesion feature establishes an adhesive bond-line thickness and protects the chemically etched exterior surface from being scraped away during insertion of the flow tube liner into the flow tube.

2. The flowmeter of claim 1 including flowmeter electronics configured to drive a current through the at least one electromagnetic coil and sense a signal developed across the plurality of electrodes.

3. The flowmeter of claim 1 wherein the adhesion feature comprises at least one groove.

4. The flowmeter of claim 3 wherein the at least one groove extends in a circumferential direction.

5. The flowmeter of claim 3 wherein the at least one groove extends in an axial direction.

6. The flowmeter of claim 3 wherein the at least one groove extends in a spiral.

7. The flowmeter of claim 1 wherein the adhesion feature comprises a plurality of grooves.

8. The flowmeter of claim 1 wherein the plurality of grooves extend in an axial direction and a circumferential direction.

9. The flowmeter of claim 1 including an adhesive between the exterior surface of the flow tube liner and the flow tube.

10. The flowmeter of claim 1 wherein the flow tube liner provides an electrical insulator between the plurality of electrodes and the process fluid.

11. The flowmeter of claim 1 wherein the flow tube is constructed from steel.

12. The flowmeter of claim 1 wherein the at least one adhesion feature is further carried on the flow tube.

13. A method of manufacturing a magnetic flowmeter for sensing process fluid flow comprising:
   obtaining a flow tube configured to receive the flow of process fluid therethrough;
   placing a plurality of electrodes in the flow tube configured to contact the process fluid;
   positioning an electromagnetic coil proximate the flow tube configured to apply a magnetic field to the process fluid;
   obtaining a flow tube liner comprising polytetrafluoroethylene (PTFE) having an interior surface configured to contact process fluid and a chemically etched exterior surface mounted to the flow tube;
   creating an adhesion feature on an exterior surface of the flow tube liner which promotes adhesion between the flow tube liner and the flow tube;
   applying an adhesive to at least one of the exterior surface of the flow tube liner and an interior surface of the flow tube; and
   inserting the flow tube liner into the flow tube and thereby bonding the flow tube liner to the flow tube with the adhesive;
   wherein the adhesion feature establishes an adhesive bond-line thickness and protects the chemically etched exterior surface from being scraped away during insertion of the flow tube liner into the flow tube.

14. The method of manufacturing a magnetic flowmeter of claim 13 wherein the adhesion feature comprises at least one groove.

15. The method of manufacturing a magnetic flowmeter of claim 14 wherein the at least one groove extends in a circumferential direction.

16. The method of manufacturing a magnetic flowmeter of claim 14 wherein the at least one groove extends in an axial direction.

17. The method of manufacturing a magnetic flowmeter of claim 13 wherein the at least one groove extends in a spiral.

18. The method of manufacturing a magnetic flowmeter of claim 13 wherein the adhesion feature comprises a plurality of grooves.

19. The method of manufacturing a magnetic flowmeter of claim 18 wherein the plurality of grooves extend in an axial direction and a circumferential direction.

20. The method of manufacturing a magnetic flowmeter of claim 13 wherein the flow tube liner provides an electrical insulator between the plurality of electrodes and the process fluid.

* * * * *